March 24, 1925.

S. MAGNANO 1,530,605

STRAND SEPARATING MECHANISM

Original Filed July 23, 1919   4 Sheets-Sheet 1

*Fig.1*

Inventor
Sebastiano Magnano,
By Roberts, Roberts & Cushman
Attorneys

March 24, 1925. 1,530,605
S. MAGNANO
STRAND SEPARATING MECHANISM
Original Filed July 23, 1919 4 Sheets-Sheet 2

Inventor
Sebastiano Magnano
by Roberts, Roberts + Cushman
Attorneys

March 24, 1925.

S. MAGNANO

STRAND SEPARATING MECHANISM

Original Filed July 23, 1919     4 Sheets-Sheet 3

1,530,605

Inventor
Sebastiano Magnano,
By Roberts, Roberts & Cushman
Attorneys

March 24, 1925.  
S. MAGNANO  
STRAND SEPARATING MECHANISM  
Original Filed July 23, 1919  4 Sheets-Sheet 4

Inventor  
Sebastiano Magnano,  
by Roberts, Roberts & Cushman  
Attorneys

Patented Mar. 24, 1925.

1,530,605

UNITED STATES PATENT OFFICE.

SEBASTIANO MAGNANO, OF LAWRENCE, MASSACHUSETTS, ASSIGNOR TO MAGNANO CORPORATION, OF LAWRENCE, MASSACHUSETTS, A CORPORATION OF MASSACHUSETTS.

STRAND-SEPARATING MECHANISM.

Original application filed July 23, 1919, Serial No. 312,765. Divided and this application filed June 23, 1923. Serial No. 647,253.

*To all whom it may concern:*

Be it known that I, SEBASTIANO MAGNANO, a subject of the King of Italy, and resident of Lawrence, in the county of Essex and State of Massachusetts, have invented new and useful Improvements in Strand-Separating Mechanism, of which the following is a specification.

This invention relates to means for automatically separating threads one by one from a sheet of threads disposed substantially in the same plane and while capable of general application as for example to yarn leasing machines, warp drawing machines or warp uniting machines is intended and more particularly designed for use in a machine for applying metallic drop wires to loom warps, such a machine being more fully disclosed in my co-pending application, Serial No. 312,765, filed July 23, 1919 of which this is a division.

In such machines it is desirable successively and rapidly to pick off or separate the end-most warps from the sheet of warps in order to permit the certain application of the drop wires thereto, and the object of the present invention is to provide means capable of performing this separating operation automatically and with accuracy.

One practical embodiment of means for carrying into effect the above objects as illustrated in the accompanying drawings in which:—

Figures 3, 6:
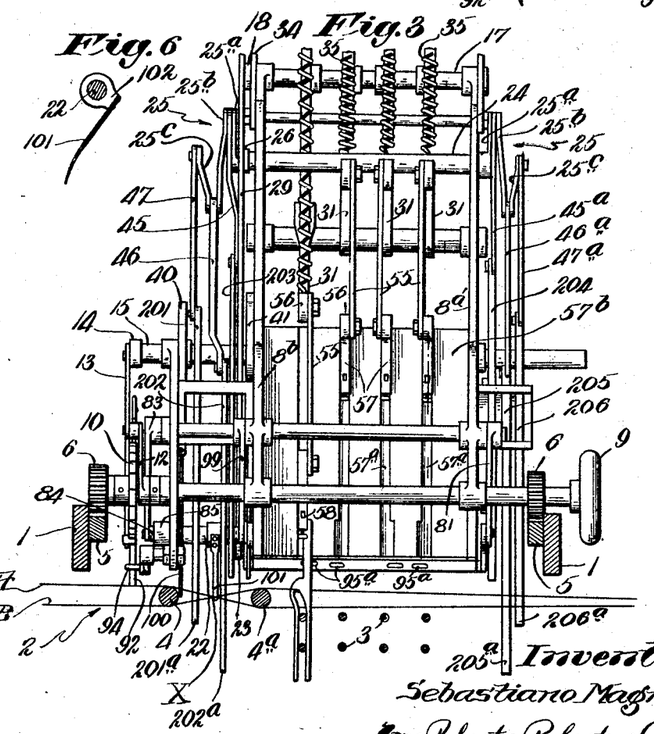
Fig. 3 is a front end elevation of the apparatus.
Fig. 6 is a detail view of a thread separating device.

As best shown in Fig. 3, my novel apparatus is supported upon frame bars or rails 1 which are designed to be arranged transversely of a loom above the sheet of warp threads indicated at 2. These rails may be considered as constituting a part of the general mechanism herein disclosed as they are carried with the other parts thereof from loom to loom and serve as a base or support for the operative instrumentalities of the machine. The bars 3 are of the usual kind employed in looms of the Draper type for retaining the hair pin drop wires in proper position and over which such wires are straddled. While bars of this type are herein disclosed, it is to be understood that they form no part of the present invention and that retainer bars of other types such as those commonly employed in the Crompton-Knowles loom may be employed if desired. In the latter type of loom the bars serve merely as partitions to separate the various banks of drop wires, but do not support them. Lease rods of usual design are indicated at 4, such rods serving to divide the warps into upper and lower series, alternate warps lying in such upper and lower groups.

To facilitate the automatic progression of the machine along the bars or rails 1, the latter are provided at their inner sides and preferably below their upper horizontal edges with racks 5, intermeshed with which are spur gears 6 on shafts 7 and 7ª (Fig. 1) journaled in the lower portion of the machine frame 8, adjacent to opposite ends of said frame. The shaft 7 is provided at one end with a hand wheel 9 for the manual movement of the frame 8 and the mechanism carried thereby.

If for any reason it should be desired to dispense with the automatic traverse of the machine, such racks and gears may be omitted without in any way affecting the general mode of operation of the more essential instrumentalities of the machine, which may in such case be moved from side to side of the loom by hand.

Figure 2:
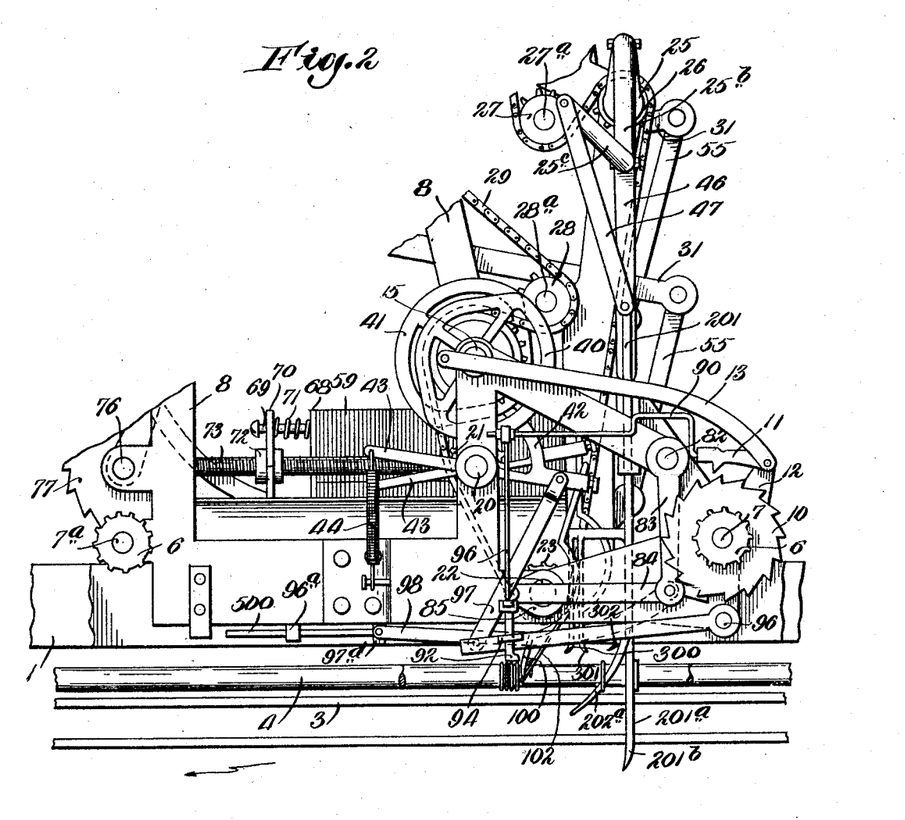
Fig. 2 is a fragmentary elevation to larger scale showing the opposite side of the apparatus.

Adjacent to the end of said shaft 7 opposite the hand wheel is a ratchet 10, Figures 2 and 3 for cooperation with which there is provided a pawl 11 on an arm 12 that is loosely mounted on the shaft 7. Connected to the said arm 12 is a pitman 13 which is also connected to a crank pin on an arm 14 fixed upon the primary drive shaft 15 which preferably, though not necessarily, derives motion from an electric motor. The pawl 11 is pivotally connected to the arm 12 and the pitman 13, and is controlled by means hereinafter described. It will be apparent that while oscillation of the arm 12 will attend the revolution of the drive shaft 15, the shaft 7 will be rotated and the frame 8 and the mechanism thereon will be moved from the drive-shaft 15 only when the pawl 11 is permitted to engage the ratchet 10. The shaft 7 may however, be rotated at any time by manual operation of the hand wheel 9.

On the drive shaft 15 is a sprocket gear 16, and in the upper portion of the frame 8 is journaled a shaft 17, having fixed thereon a sprocket gear 18 and carrying four cams 19. Below the drive shaft 15 is a shaft 20 at one side of the machine (see Fig. 2) and on which is a loose idler sprocket gear 21, and below the shaft 20 is a shaft 22 on which is fixed a sprocket gear 23. A shaft 24 extends transversely across the frame at its front upper portion and fixed thereon at opposite ends are cranks 25. A sprocket gear 26 is also fast on shaft 24 and at 27 and 28 are idler sprocket gears supported upon the stub shafts $27^a$, $28^a$ respectively fixed in frame 8. Trained around the sprocket gear 18, the sprocket gears 27 and 26, the sprocket gear 23, the sprocket gear 21, the sprocket gear 16 and the sprocket gear 28, as best shown in Figure 2, is a sprocket belt or chain 29 through the medium of which the shafts 17, 22, 24, are driven from the drive shaft 15.

Pivoted on a shaft 30 carried by the frame 8 are vertically swinging lever arms 31, four in number, on which are upstanding bracket members 32, equipped with antifriction wheels 33 engaging the peripheral surfaces of the respective cams 19. A yoke 34 extends upwardly from the frame 8, and interposed between the transverse portion of the said yoke 34 and the several arms 31 are retractile springs 35 which serve yieldingly to hold the antifriction wheels 33 in engagement with the surfaces of the cams 19.

Figure 4:
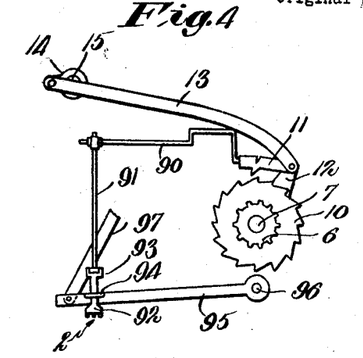
Figs. 4 and 5 are detail views of the mechanism for progressing the device across the series of warp threads.
Figure 5:
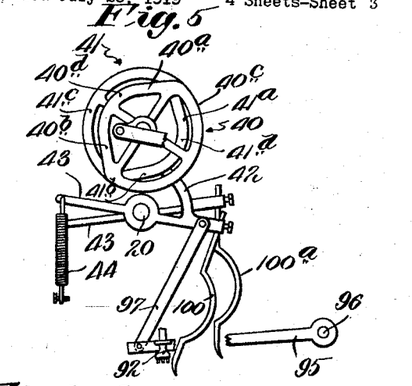

Fixed on the drive shaft 15 and relatively arranged as best shown in Figures 2 and 4, are cams 40 and 41, and engaging the peripheral surfaces of the respective cams are laterally extending lugs 42 on rocker arms 43, which lugs 42 are held under yielding pressure against the cams by retractile springs 44 acting on the rear ends of arms 43. These cams are of complemental form having active portions $40^a$, $40^b$, $41^a$, $41^b$, respectively with interposed dwells $40^c$, $40^d$, $41^c$, $41^d$, respectively, the dwell portions of each cam being diametrically opposite one another, and the portions $40^c$, $41^c$, being of greater extent than the portions $40^b$, $41^b$.

From the foregoing it will be apparent that oscillation of the arms 31 and the rocker arms 43, as well as rotation of the shaft 24, will attend rotation of the drive shaft 15.

Figure 1:
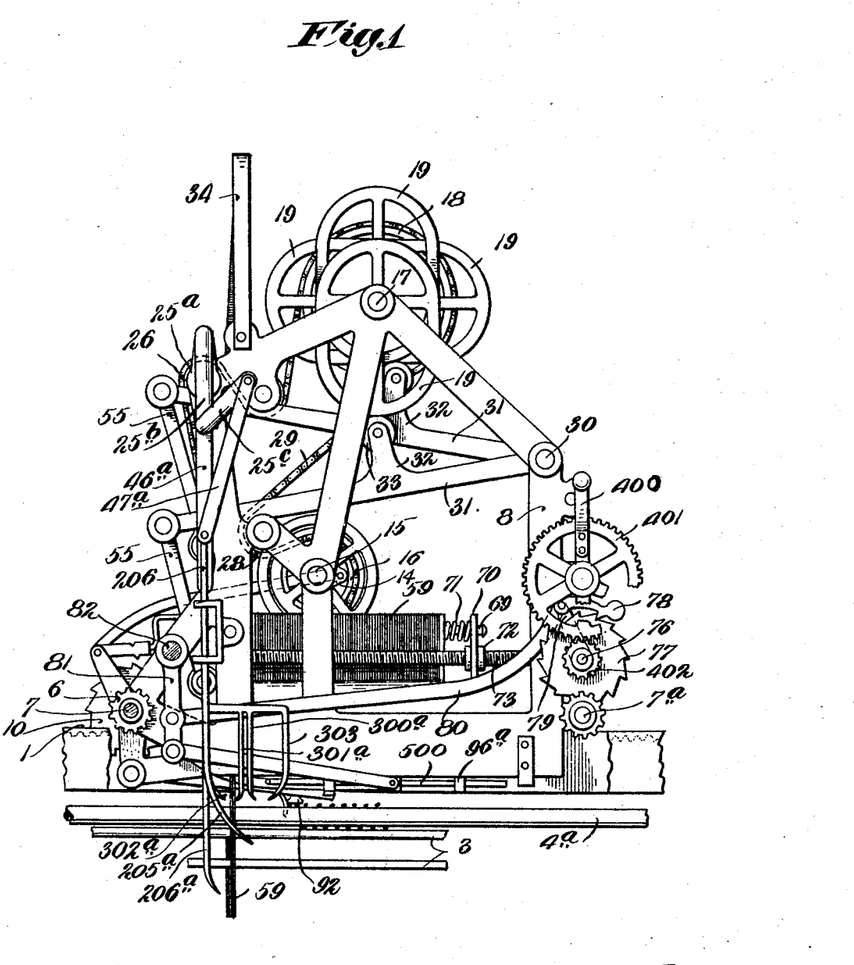
Fig. 1 is a fragmentary side elevation of the right hand side of the apparatus.

The cranks 25 at the ends of the shaft 24 as best shown in Figure 3 each comprises the portions $25^a$, the portions $25^b$ and the portions $25^c$, Figures 1 and 3; said portions, $25^a$, $25^b$ and $25^c$ being integral or fixed with respect to each other. The triple cranks thus formed have their crank pins arranged substantially 90° apart. Said crank pins are connected through links 45, 46 and 47; $45^a$, $46^a$, $47^a$, respectively, with members 201, 202, 203, 204, 205, 206, guided to reciprocate vertically in the machine frame and which serve to actuate the warp separating and positioning devices, all of which will be described at length hereinafter.

Pivotally connected to and depending from the free ends of the arms 31 are rods 55 which are respectively pivotally connected at their lower ends to brackets 56 carried by the slides 57, Figure 3. Four magazines for drop wires 59 are arranged in a transverse series in the machine frame, each magazine being provided with a horizontal rod that extends in the direction of the length thereof and is fixedly supported at the rear end of the magazine. Each magazine may also comprise a bottom wall and side walls, but if the magazine is to be used for holding drop wires of the straight sided type, the side and bottom walls of the magazine may be omitted altogether and the wires suspended from the guide rods.

Movable in each magazine 62 is a follower 68, Figure 2, and each follower has two stems 69 that extend loosely through a cross-bar or plate 70 and are provided with heads in the rear of said cross-bar. Surrounding the stems 69 and interposed between the followers 68 and the cross-bar 70 are expansion springs 71 which have for their function to hold the followers 68 under yielding pressure against the drop wires 59 disposed in front of the followers. At its opposite ends the cross-bar 70 is provided with internally threaded sleeves 72 which constitute nuts engaging threaded shafts 73, so that rotation of the shafts in one direction will be attended by the simultaneous forward movement of the followers 68 whereby to compact the series of drop wires in the magazine and to gradually feed them toward the discharge end thereof.

The slides 57 are guided for vertical reciprocation in dovetail slots 57ª in a plate-like head or support 57ᵇ suitably secured in the vertically extending members 8ª, 8ᵇ of the frame 8. The rearward face of the head 57ᵇ is spaced from the forward end of the magazine a distance very slightly greater than the thickness of one of the drop wires for use with which the machine is intended.

The dovetail slots 57ª have vertically disposed centrally arranged extensions opening at the rear face of head 57ᵇ, such extensions being of less width than the width of the drop wires and disposed with their vertical center lines substantially in the vertical central planes of the respective magazine compartments. Thus as the drop pins are forced forwardly in the magazine the lateral portions of the front face of the foremost wires come into contact with the rear face of the head 57ᵇ on either side of the slots 57ª, such head 57ᵇ thus serving as a stop or abutment for limiting the movement of the wires in the magazine. Passing through a suitable opening in each of the slides 57 is a selector pin 58, suitably secured in said opening, preferably in an adjustable manner. The pins 58 project to the rear of the slides 57 and pass through the extensions of the slots 57ª, the rear ends of such selector pins extending beyond the rear wall of the head 57ᵇ to a distance slightly less than the thickness of one of the drop wires.

Fixed on the rear ends of the shafts 73 are miter gears that are intermeshed with miter gears fixed on a shaft 76 on which is also fixed a ratchet 77. For cooperation with the ratchet 77, and in order to turn the shaft 76 and feed the followers 68 forwardly in a step by step manner, I provide the pawl 78 pivoted to an arm 79 that is loose upon the shaft 76 and is oscillated through the medium of a link 80, by an arm 81 on a shaft 82. The shaft 82 is provided at the opposite side of the machine frame with an arm 83, Figure 2, that is connected through a link 84 with a crank 85 fixed to the shaft 22, whereby the shaft 82 will be rocked and the shaft 76 will be turned, step by step, for the purpose before described.

When the supply of drop wires 59 in the magazine is depleted, the bar 78 is disengaged from the ratchet wheel 77 and the shaft 76 is rotated in reverse direction through the medium of a crank 400 having a spur gear 401 fixed with respect thereto, said gear meshing with a spur gear 402 fixed on the shaft 76. This arrangement is best shown in Figure 1.

Fixed with respect to the pawl 11, (Figs. 2 and 4) is a rod 90, and fixed to and depending from said rod 90 is a stem 91 having at its lower end a hammer 92 adapted to rest on a considerable number of warp threads, such number varying of course with the fineness of the warps employed. As herein illustrated, the hammer is shown as engaging a very limited number of yarns, as of course the relative size of the latter as respects the mechanism has been greatly exaggerated for clearness of illustration. Commonly the hammer would engage from forty to one hundred threads.

The said stem 91 is provided with an abutment in the form of a collar 93, and passes loosely through a guide 94 on a rocker arm 95, the collar 93 being above the guide 94. The arm 95 is pivoted at 96 and is connected through a link 97 with one of the rocker arms 43, so as to derive oscillatory motion therefrom. Manifestly when the pawl 11 is supported out of engagement with the ratchet 10 by the imposition of the hammer 92 on a plurality of warp threads as stated, the frame or carriage 8 will remain at rest unless moved manually. When, however, the warp threads have all been removed from under the said hammer 92 and said hammer is permitted to move downwardly, the carriage 8 will be moved in the direction indicated by the large arrow at the bottom of Figure 2, which direction will hereinafter be referred to as rearwardly.

Figure 14:
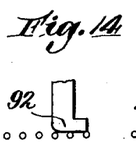
Figs. 14, 15, 16 and 17 are diagrammatic views illustrating the operation of the detector device which controls the movement of the machine across the series of threads.

The subsequent upward movement of the hammer 92 will be effected by the guide 94 bringing up against the abutment 93 on the stem 91. As indicated in Figures 2, and 14, the hammer 92 normally rests upon one or more of the warp threads 2 which as yet have not been supplied with drop wires. If desired the parts may be so proportioned that at each upward oscillation of the arm 95 the hammer will be lifted slightly from the threads. While this is not strictly necessary, it is desirable, as it tends to facilitate the restoration of the hammer to proper operative position after it has been permitted to fall.

Figure 15:
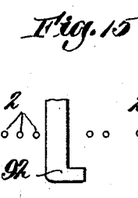
Figures 16, 17:
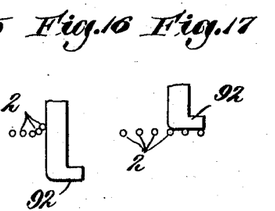

The threads are selected one by one and removed from beneath the hammer 92, and as the last thread is removed, the hammer is permitted to fall with the downward oscillation of arm 95 as indicated in Figure 15. The pawl 11 immediately engages a tooth of the ratchet wheel 10 and therethrough serves to impart a traverse movement to the machine frame rearwardly along its supporting rails 1. This movement will usually be of the order of one eighth of an inch and is sufficient to carry the hammer 92 into position for engagement with a fresh group of threads. As the machine moves rearwardly the hammer is moved upward simultaneously with or immediately after such movement of the frame. As the frame moves it carries the rear side of the hammer into engagement with the warp threads, thus crowding them back as indicated in Fig. 16. The rear side of the hammer may be straight and substantially vertical if desired, or of any other form not seriously interfering with its upward movement past the group of threads with which it contacts.

As the arm 95 now oscillates upwardly and the lower face of the hammer rises above the plane of the warp threads, the bunched up threads spring forward and distribute themselves in the normal warp plane as indicated in Figure 17, thus serving to support the hammer as the hammer lifting arm 95 begins its next down stroke. As the hammer is raised to normal position, pawl 11 is raised from contact with ratchet wheel 10 and thus the movement of the machine frame ceases until the new group of threads beneath the hammer is exhausted.

Movable longitudinally of the carriage of frame 8 in a plane below the magazines are opener rods 500, four in number and so denominated because they are provided at their forward ends with lateral arms $95^a$ adapted to spring apart the legs of pins 59 after the manner shown in Figures 11 and 12. As the drop wire emerges from the magazine, it lies substantially in the plane of its respective warp thread and it is thus obviously necessary to flex one or both legs of the drop wire out of such plane in order to permit the legs to pass upon opposite sides of the yarn as they are projected toward it.

Figure 11:
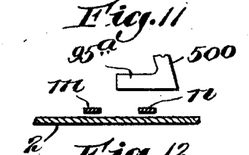
Figs. 11 and 12 are fragmentary, horizontal sectional views to enlarged scale illustrating the operation of springing a drop wire to permit it to slip over a thread.
Figure 12:
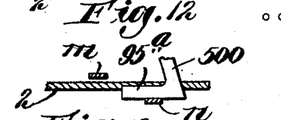
Figure 13:
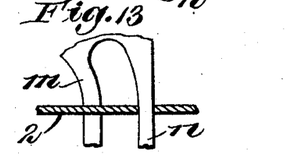
Fig. 13 is a fragmentary elevation to large scale illustrating the position of a drop wire relative to its thread in passing over the latter.

This operation is illustrated in Figs. 11 and 12 wherein the legs $m$, $n$ of the drop wires are shown in the normal plane before engagement by the arms $95^a$ of the slide rods 500, and also with the leg $n$ pushed forwardly out of such plane by the action of the arm $95^a$. In Fig. 13 is shown the result of such operation, the drop wire having nearly completed its movement and straddling over the thread. It will be understood that at the beginning of such flexing movement, the upper part of the drop wire is still gripped between the rear wall of the head $57^b$ and the next succeeding drop wire, thus permitting the arm $95^a$ to flex forward the leg $n$ of the wire without substantially affecting the position of the other leg.

The said rods 500 are guided for reciprocating movement by passing through suitable openings in cross-bars $96^a$, and have their rear ends connected to a cross-head $97^d$ which, in turn, is connected by links 98, with arms 99 and 81 on the shaft 82.

To each of the rocker arms 43 is secured a downwardly extending finger as 100, $100^a$, constituting a hold-back for warp threads. The two fingers 100, $100^a$ are located upon opposite sides of the crossing point X of the leased warps. As will be clear from inspection of said figure the leasing of the warps divides them into two series, the threads of the series A passing above the lease rod 4 and below the lease rod $4^a$ while the threads of series B pass below lease rod 4 and above lease rod $4^a$. The length of the hold-back fingers 100, $100^a$ is such that when in the lowermost position they extend below the plane of the warps lying above the lease rods but do not contact with warps passing below said rods.

As alternate warp threads lie in series A and B respectively it will be clear that, if for example, the foremost thread belongs to the B series and the hold-back finger 100 is down as shown in Fig. 3, while the hold-back finger $100^a$ is up and entirely out of contact with the threads, it will only be possible to pick off and separate the foremost B thread from the entire mass of wrap threads. This thread is entirely free, hold-back $100^a$ being up, but the next thread, being the foremost A thread is held back by finger 100. As the second B thread crosses behind the front A thread, it cannot escape until the latter thread has been released. Thus the parts positioned as shown in Fig. 3, it is only possible to separate a single thread, and that the foremost B thread, from the entire mass of wraps.

As the hold-back fingers 100, $100^a$ are moved down into operative position alternately by operation of cams 40, 41, as above described, the foremost threads of the series A and B respectively, are alternately released but in each case only a single thread is free for separation from the warp sheet.

For separating the released foremost thread, whether from series A or B, a thread separator or picker is employed. This picker comprises a flexible blade 101 (Figs. 3 and 6) secured to a collar or bracket 102 fixed on shaft 22.

For properly holding the separated threads for the reception of the drop wires, and to convey the loaded warps away from said position, the following mechanism is employed. To the lower ends of members 201, 206, are secured thread retainers $201^a$, $206^a$, respectively and to the lower ends of members 202, 205 are secured thread pushers $202^a$, $205^a$ respectively. To the innermost members 203, 204 respectively are secured brackets $203^a$, $204^a$ having downwardly extending fingers 300, 301, 302, $300^a$, $301^a$, $302^a$, 303 respectively.

As the thread retainers, pushers and positioners upon opposite sides of the machine are substantially alike, and are operated simultaneously and by substantially like mechanism and for the same purpose it is necessary to describe but one set of these members in detail. As indicated in Figs. 7 to 10, the thread retainer $201^a$ is a substantially straight vertically disposed bar having its lower end terminating in a sharp edge directed somewhat to the rear as indicated at $201^b$.

The thread pusher $202^a$ comprises a downwardly directed rod having its lower end curved toward the rear to provide an upwardly and forwardly extending cam surface $202^b$. The thread positioner comprises the substantially horizontal rearwardly extending bracket $203^a$ having depending from its front end the finger 302 curved rearwardly at its lower extremity. From the central portion of the bracket $203^a$ a pair of spaced fingers 300, 301, extend downwardly providing between them a narrow vertical slot 310. The lower ends of the fingers 300, 301 are curved in opposite directions thus providing a flaring mouth 311 leading to the slot 310. The width of the slot 310 may be substantially equal to the diameter of the warp threads with which the machine is to be employed. If desired the lower ends of the fingers 301, 302 may be united, this however being unessential.

To the rear end of one or both of the thread positioner brackets $203^a$, $204^a$ another depending finger as 303 (Fig. 1) having a forwardly directed lower extremity may be secured. This finger serves as a retainer for the unseparated series of threads and while useful under some circumstances is not necessary to the successful operation of the mechanism and is not indicated in Figs. 7 to 10.

The operation of the machine in general is as follows, it being understood that the warp threads are in position in the loom frame and that the loom is ready to operate. In fact, if desired, the loom may be in operation for weaving during the operation of the machine herein disclosed.

The warps being stretched across the loom frame as above stated, the rail members 1 are placed transversely across and above the warps and secured to the loom frame in any desired manner. The machine herein disclosed is then set upon the rails at the extreme right hand side of the loom, that is to say, the front of the wire placing machine is directed toward the right hand side of the loom frame. The several compartments of the magazine are now supplied with drop wires which are compacted by the following members 68. The machine is now moved rearwardly along the rails by means of the hand wheel 9 until the hammer 92 is brought above the right hand warp threads of the series. Power may now be applied to the drive shaft of the machine whereupon the various operative instrumentalities will be set in motion.

Figure 7:
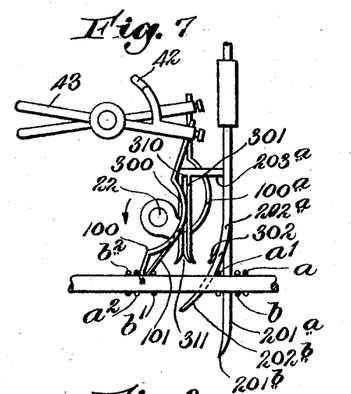
Figs. 7, 8, 9 and 10 are diagrammatic side elevations of the thread separating and positioning devices, illustrating the sequence of operations in isolating a thread for receiving its drop wire.

Referring now to Figs. 7 to 10 inclusive as illustrative of the thread separating and positioning devices, it may be stated that Figure 7 shows the operation as having proceeded to a point where warp threads $a$, $b$ and $a'$ have been provided with drop wires. The threads designated $a$, $a'$ etc. are intended to indicate those of the A series as shown in Fig. 3 while the threads $b$, $b'$ etc. are those of the B series of said figure, that is to say, the threads indicated by $a$, $a'$ pass over the front lease rod 4 of the loom while the threads $b$, $b'$ pass over the rear lease rod $4^a$ of the loom. In Fig. 7 the hold-back finger 100 is in engagement with a thread $a^2$ of the A series thereby holding this thread back and preventing its separation from the mass of warp threads. As the next thread $b^2$ crosses behind the thread $a^2$ at the crossing point X of the lease it is unable to escape and the same is true of all preceding threads of the series.

The hold-back finger $100^a$ is in inoperative position and thus the foremost thread $b'$ of the B series is free from restraint. The separator blade 101 is shown as sweeping downward in the direction of the arrow, Fig. 7, and as having moved over the threads $a^2$, $b^2$, without affecting the latter. The blade has however, begun to move the thread $b'$ to the right. In the same figure the thread retainer $201^a$ is shown in position for preventing the threads $a$, $b$, which already have received their drop wires from snapping back toward the unloaded series from which they have been separated. This retainer device as indicated in this figure is on its way up.

In the same figure the thread pusher device $202^a$ is moving downwardly and is shown as engaging the thread $a'$ which has just received its drop wire. As this pusher device moves downwardly and the retainer device $201^a$ moves upwardly the thread $a'$ will be pushed in a transverse direction into the series including the threads $a$, $b$.

Figure 8:
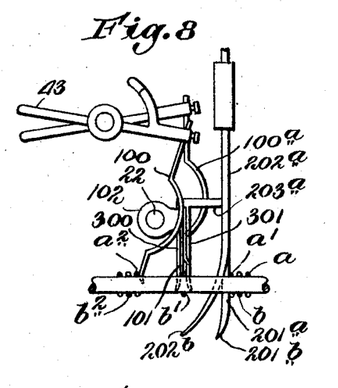

Figure 8 shows the operation as having proceeded somewhat further, the thread $a'$ having been pushed over against the thread $b$ and the retainer $201^a$ having moved downwardly again to retain such thread in position. The thread pusher $202^a$ is now moving upwardly. The separator blade 101 has moved to a sufficient extent to bring the thread $b'$ into the vertical plane of movement of the thread positioner comprising the spaced arms 300, 301. This device is shown in Fig. 8 as moving downwardly and having just engaged such thread whereby to hold it for reception of a drop wire.

Figure 9:
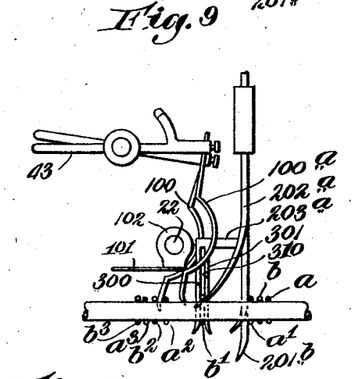

In Fig. 9 the thread retainer $201^a$ is shown as still retaining the thread $a'$. The thread pusher is indicated as beginning the downward movement, its lower extremity passing behind the thread $b'$ ready for engagement therewith. The positioner is now going up and about to release the thread $b'$ which has received its drop wire from the wire placing device. The hold-back member 100 is just swinging away from its operative position while the hold-back member 101 has been moved to operative position. The exchange of the hold-back members has resulted in the release of the foremost thread $a^2$ of the A series, while the foremost thread $b^2$ is held against separation from the other threads by the finger 101. The holding back of the thread $b^2$ now serves to prevent movement of any of the threads such as $a^3$, $b^3$ lying to the rear thereof. The separator blade 100 is shown as having completed substantially three-fourths of a revolution and as being about to engage the warp threads in the plane of the crossing X.

Figure 10:
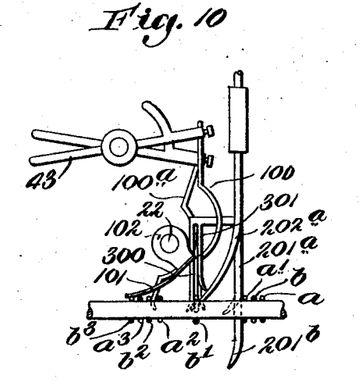

In Figure 10, the parts are shown in substantially the position of Fig. 9 with the exception that the blade 101 has moved slightly further and is now engaging warp threads such as $a^3$, $b^3$, the blade being flexible and dragging freely over these threads. As the thread $a^2$ is free of restraint however, the blade will after passing thread $b^2$, snap down between the threads $a^2$, $b^3$ in the manner indicated in Figure 9 and the operation as above outlined will be repeated.

At each rotation of the blade 101 a picker member 58 will be moved downwardly by its corresponding cam 19 and will positively push downwardly the foremost drop wire from its particular magazine compartment. As the drop wire begins to move downwardly, the corresponding finger 95$^a$ is moved forwardly to spring one of the legs of the drop wire out of its normal plane as indicated in Fig. 12. The thread is at this time held at opposite sides of the machine by the thread positioner devices and directly below the path of the descending drop wire which is thus caused to straddle such thread in the manner indicated in Fig. 13, the plane of the drop wire being substantially parallel to the axis of the thread.

As each thread is provided with a drop wire it is moved by the pusher devices out of the path of the descending drop wires and the loaded threads are held against backward movement by the retainers. As the machine continues to operate the pawl 78 actuates the ratchet wheel 77 and through the connections described turns the screw threaded rods 73, thus slowly moving the follower plates 68 toward the front of the machine and feeding the drop wires along the magazine compartments toward their discharge ends.

As the machine continues to pick off warp threads from the unloaded series it may gradually be progressed along the rails by manipulation of the hand wheel 9 in order to permit the separator blade 101 to operatively engage fresh threads of the series. If however, it is desired to have the machine operate automatically, the hammer device 92 is employed, such device as above stated resting at the beginning of the operation upon a series of the unloaded threads. The hammer may be of sufficient extent to rest upon from 40 to 100 threads, such being approximately the number that the separator device can reach without movement of the mechanism along the track.

It being assumed now that the group of threads beneath the hammer is exhausted, the hammer will drop as indicated in Fig. 15 whereupon the pawl 11 drops into a tooth of the ratchet wheel 10. The next vibration of the pawl moves the ratchet wheel thereby to traverse the machine along its rails a distance substantially equal to the length of the hammer. Such length may be of the order of $1/8$ of an inch. As the hammer moves laterally with the machine while in its lower position, it of course, tends to compact or pile up the adjacent warp threads as indicated in Fig. 16. As the arm 95 is continually oscillating, the member 94 lifts the hammer 92 almost immediately after its dropping, carrying it to a point slightly above the plane of the warps. As the warps 2 are under some tension they immediately snap beneath the hammer as indicated in Fig. 17 and upon the downward oscillation of the member 95, the hammer again rests upon the warp threads. The pawl 11 is thus rendered inoperative and the machine remains at rest until another exhaustion of threads beneath the hammer.

In its general mode of operation the machine is not dependent upon the particular type of drop wire employed, as drop wires having parallel edges or edges of any desired figuration may be placed on the warp threads by the machine, it being simply necessary to change the shape of the magazine walls to conform to such wires. It is furthermore evident that while certain specific operative connections have been disclosed whereby to transmit motion from the main drive shaft to the several operative instrumentalities, other and equivalent connecting mechanisms might be substituted without in any manner departing from the spirit of the present invention. It is also clear that changes in the specific shapes and relative proportions of the various thread manipulating devices as well as changes looking toward the proper adjustment of the various mechanisms may be embodied in the structure without in any manner changing the fundamental mode of operation of the same.

I claim:

1. That method of separating strands one by one from a plurality of strands which comprises arranging said strands in two series with the strands from each series in alternation and lying in intersecting planes, holding back all the strands of one of said series at a point to one side of the line of intersection of said planes, and passing a strand separating instrument in wiping contact over said strands adjacent to and substantially parallel to said line of intersection.

2. That method of separating successive strands from a series of continuous strands which comprises leasing said strands to provide two groups lying in intersecting planes, and alternately holding back a single strand of one of said groups at points at opposite sides of the line of intersection of said planes whereby to restrain all but the foremost strand of the other group, and picking off said unrestrained foremost strand by means of an instrument engaging said strand with wiping contact.

3. That method of separating successive strands from a plurality of strands which comprises leasing said strands to form two series lying in intersecting planes with the strands of said series alternating at the line of intersection of said planes, holding back all the strands of each series alternately by engagement with the endmost strand thereof at a point to one side of the line of intersection, and picking off the endmost strand of the unheld series by passing a strand separating instrument in wiping contact over said strands at a point intermediate the points at which the strands are alternately held back.

4. That method of separating successive strands from a plurality of strands which comprises arranging said strands in alternation to form two series lying in planes intersecting along a single line, holding back all the strands of one of said series at a point to one side of the line of intersection of said planes, picking off the endmost strand of the other series by wiping engagement therewith adjacent to said line of intersection while maintaining the position of all other strands unchanged, releasing the strands of said first series, holding back the strands of the other series by engagement therewith at a point upon the opposite side of said line of intersection, and picking off the endmost strand of said first series.

5. In a machine of the class described, a carriage movable over a sheet of strands, means for restraining all but the endmost of said strands against transverse movement, means for separating the endmost strand from the series, means for temporarily holding said separated strand in a predetermined position and means for moving such strand further from said series upon its release from the restraining means.

6. Mechanism of the class described comprising means for picking off the endmost thread from a series of threads, means for temporarily holding the picked off thread stationary in a predetermined position spaced from adjacent threads of the series, and means for further moving said thread in the same direction away from said predetermined position to a new position and for retaining it in the latter position.

7. Mechanism for separating successive threads from a sheet of continuous threads comprising a picker for picking off the endmost thread of the sheet, and substantially like groups of elements spaced longitudinally of the thread and constructed and arranged to receive the thread from the picker temporarily to hold it stationary and separated from adjacent threads, to move it transversely of its length to a new position, and to retain it in its new position.

8. In a machine for operating upon warp threads, warp positioning means comprising a pair of lease rods for dividing the warps into distinct series, a pair of warp hold-back devices alternately operable to engage a single thread, and a single warp separator common to both series of warps and movable in the plane of crossing of the threads of the two series and intermediate said hold-back devices.

9. In combination, in mechanism for manipulating strands, means for supporting strands in two intersecting series, hold-back means engageable with the foremost strand only of one of said series, and separator means movable into engagement with the endmost strand of the other series adjacent to the plane at which the strands of the respective series cross, for parting such endmost strand from the other strands of both series.

10. In mechanism of the class described, means for supporting yarns in two series, the strands of said series alternating and intercrossing in substantially a single plane, means for holding back the foremost yarns of the respective series, means for rendering operative said hold-back means in alternation, and a rotary separator device movable into engagement with said yarns substantially at said plane for parting the foremost yarn from the other yarns of each of said series alternately.

11. In a mechanism for alternately parting the foremost warp from the upper and lower sheets of a series of leased warps, in combination, a pair of alternately operative hold-back fingers for engagement with the foremost warp of the respective series, and a wiper member for engaging and separating the foremost warp from that series whose hold-back finger is temporarily inoperative.

12. In combination with a mechanism for manipulating threads of a series, a device for separating threads one by one from said series, a device for positioning said threads for a subsequent operation, a positioner device for moving said threads from the position occupied when engaged by said positioning device, and a retaining device for preventing backward movement of said threads from the position to which they are carried by said positioner device.

13. In a mechanism for manipulating threads of a series, means for moving the endmost thread from said series, means for holding said thread temporarily in a predetermined position, means for moving said thread from said latter position, and means for retaining said thread in its new position, the thread remaining in the plane of the series throughout the entire operation.

14. In a mechanism of the class described, means for separating a thread from a series of continuous threads, for holding said thread stationary temporarily in an intermediate position, and for moving said thread into a new position to form a second series, the thread remaining substantially in the plane of the series throughout the entire operation.

15. In a machine of the class described, warp placing means comprising a warp positioner, a warp pusher and a warp retainer, means for guiding said devices for reciprocating movement, a shaft, and means for transmitting movement from said shaft to the said respective warp placing means.

16. In a device for manipulating yarns, means for supporting a series of yarns, means for separating yarns one by one from said series, said separating means comprising a unidirectionally moving resilient member.

17. In a mechanism for separating warps one by one from a series of leased warps, a flexible element movable in a closed path lying substantially in the vertical plane of the crossing of said leased warps, and means for moving said flexible element whereby to cause it to engage a plurality of warps including the endmost warp of said series.

18. In a mechanism for separating threads one by one from a leased series of continuous threads, a pair of hold-back devices alternately engaging threads of said series at opposite sides of the crossing point thereof, and a separator device operative at a point intermediate of said hold-backs for picking off the endmost thread of the series.

19. In combination in mechanism of the class described, means for holding a plurality of strands in position for the separation of strands one at a time, and a resilient separator member rotating continuously in a plane intersecting said strands.

20. In a machine of the class described, a rotatable support, means for supporting a warp thread in a plane transverse to the plane of rotation of said support, and a flexible separator member fixed to said support and engageable in its rotation with said warp thread.

21. In a machine for placing drop wires on warps, a rotatable support, and a flexible warp separator carried thereby, said separator being constructed and arranged to flex in the plane of rotation of said support.

22. In a mechanism for separating threads one by one from a series and for positioning them for a subsequent operation, a rotary separating device and a reciprocable positioning device.

23. In a machine of the class described, a warp hold-back, a warp separator, a warp positioner, a warp pusher and a warp retainer, said devices being constructed and arranged to move warp thread successively from one series thereof to another series.

24. In a mechanism for separating threads one by one from a series, means for leasing said series to provide a crossing of the threads thereof, a pair of hold-back devices rocking about fixed axes and movable alternately into engagement with threads on opposite sides of said crossing, and cam means for actuating said hold-back devices.

25. In a device for separating threads one by one from a series, a pair of hold-back devices engageable with alternate threads of said series, a rotatable shaft, and a pair of cams mounted upon said shaft for actuating the respective hold-back devices, each of said cams comprising active portions and dwell portions, such portions being constructed and arranged to maintain one of said hold-back devices in operative position until the other of said devices has been moved from inoperative to operative position.

26. In combination in a mechanism for separating threads one by one from a series, means for leasing said series to provide a crossing point, a pair of hold-back devices movable into engagement with the threads upon opposite sides of the crossing point respectively, and a pair of cams for actuating said hold-back devices, said cams each comprising a pair of active surfaces and a dwell surface therebetween.

27. In a mechanism for separating threads one by one from a series, hold-back devices for engaging alternate threads of the series, and cam means for actuating said hold-back devices, said cam means each comprising a cam disk having a pair of active surfaces with a pair of dwell surfaces therebetween, one of said dwell surfaces being of substantially greater extent than the other.

28. In a machine of the class described, means for successively separating warps from a series, said means comprising a pair of pivoted hold-back members, and a pair of cams for actuating said members in alternation, said cams comprising active portions and dwell portions, a dwell portion of one cam being arranged substantially diametrically opposite to the similar dwell portion of the other cam.

29. In a textile machine, means for separating successive warps from a series, said means comprising a pair of movable holdback members, and a pair of cams for actuating said members in alternation, said cams each comprising diametrically arranged concentric dwell portions of different angular extents, and active substantially straight portions connecting the ends of said concentric portions.

30. In a machine of the class described, a thread retainer, a thread separator, and a reciprocable thread positioner comprising substantially parallel members spaced to provide a slot for the reception of a thread, said slot being open at one end to permit entrance of the thread.

31. In combination in mechanism of the class described, a thread positioner device comprising elements providing a narrow, open ended slot for the reception of a thread, and means for reciprocating said device toward said thread whereby to enter the thread within the slot.

32. In a device for separating threads one by one from a series and for positioning said threads for a subsequent position, separating means, and a thread positioner comprising a reciprocable member and a pair of spaced fingers carried thereby, said fingers providing therebetween a narrow slot for the reception of a thread.

33. In a mechanism of the class described, a thread positioner device comprising a member reciprocable toward and from a thread, and a pair of depending elements secured thereto in substantially parallel relation and providing a slot therebetween, said elements at their free extremities being divergent, one from the other.

34. Mechanism for separating successive threads from a horizontally disposed sheet of threads comprising a vertically reciprocable bar having an outstanding bracket, and a pair of substantially parallel fingers depending from the bracket and spaced to provide a vertical slot for the reception of a thread, said fingers diverging at their lower ends.

35. In a mechanism of the class described, in combination, a thread positioner device comprising elements providing a narrow slot therebetween, said slot having a flaring mouth, and means for moving said element toward a thread to cause the entrance of said thread through said mouth into said slot whereby to hold said thread in definite position.

36. Mechanism for separating successive threads from a horizontally disposed sheet of threads comprising a vertical reciprocable bar provided with a lower portion curved in a vertical plane intersecting the plane of the sheet of threads, said curved portion constituting a cam engageable with a thread of the sheet for moving said thread transversely of its length.

37. In a mechanism of the class described, a thread positioner comprising a pair of substantially straight parallel members spaced to provide an open ended thread engaging slot, said members diverging at their extremities to provide a flaring entrance to the slot, and means for reciprocating said positioner in a plane intersecting said thread.

38. In a machine of the class described, a reciprocable thread positioner, having an open ended slot, and means for moving said member transversely to the thread to cause the latter to enter the slot.

39. In a mechanism for manipulating threads, a device movable toward a thread and having an open ended slot to take over the same, and a thread restraining finger movable with said device and spaced from said slot.

40. Mechanism of the class described comprising a plurality of vertically reciprocable bars, a thread positioner carried by one bar, a thread pusher carried by another bar, a thread retainer carried by another bar, and means for moving said bars in predetermined timed relation.

41. Mechanism of the class described comprising a thread separator, a plurality of reciprocable bars, a thread positioner carried by one bar, a thread pusher carried by another bar, a thread retainer carried by another bar, and means for moving said separator and the several bars in timed relation whereby successively to place the positioner over a thread picked by the separator, to remove the positioner and engage the thread pusher with the thread, and to remove the pusher and engage the retainer with the thread.

42. In a mechanism for manipulating threads, means for picking off threads of a series and advancing the same, a positioning device movable into engagement with a thread so advanced, and a stop member carried by said device and constructed and arranged to prevent the accidental advance of another thread of said series until said first thread has been released by said positioning devices.

43. Mechanism for separating successive threads from a sheet of threads comprising a separating member for picking off the endmost thread from the sheet, and a reciprocable thread positioner having spaced substantially parallel fingers supported at one end and free at the other to provide a slot for the reception of the separated thread, said fingers diverging at their free extremities to provide a flaring entrance to the slot.

Signed by me at Lawrence this 15th day of June 1923.

SEBASTIANO MAGNANO.